No. 692,137. Patented Jan. 28, 1902.
H. M. HARDING.
SUPPORT FOR TROLLEY AND TRACK WIRES FOR SUSPENDED CABLE ROADS.
(Application filed Apr. 19, 1901.)
(No Model.)
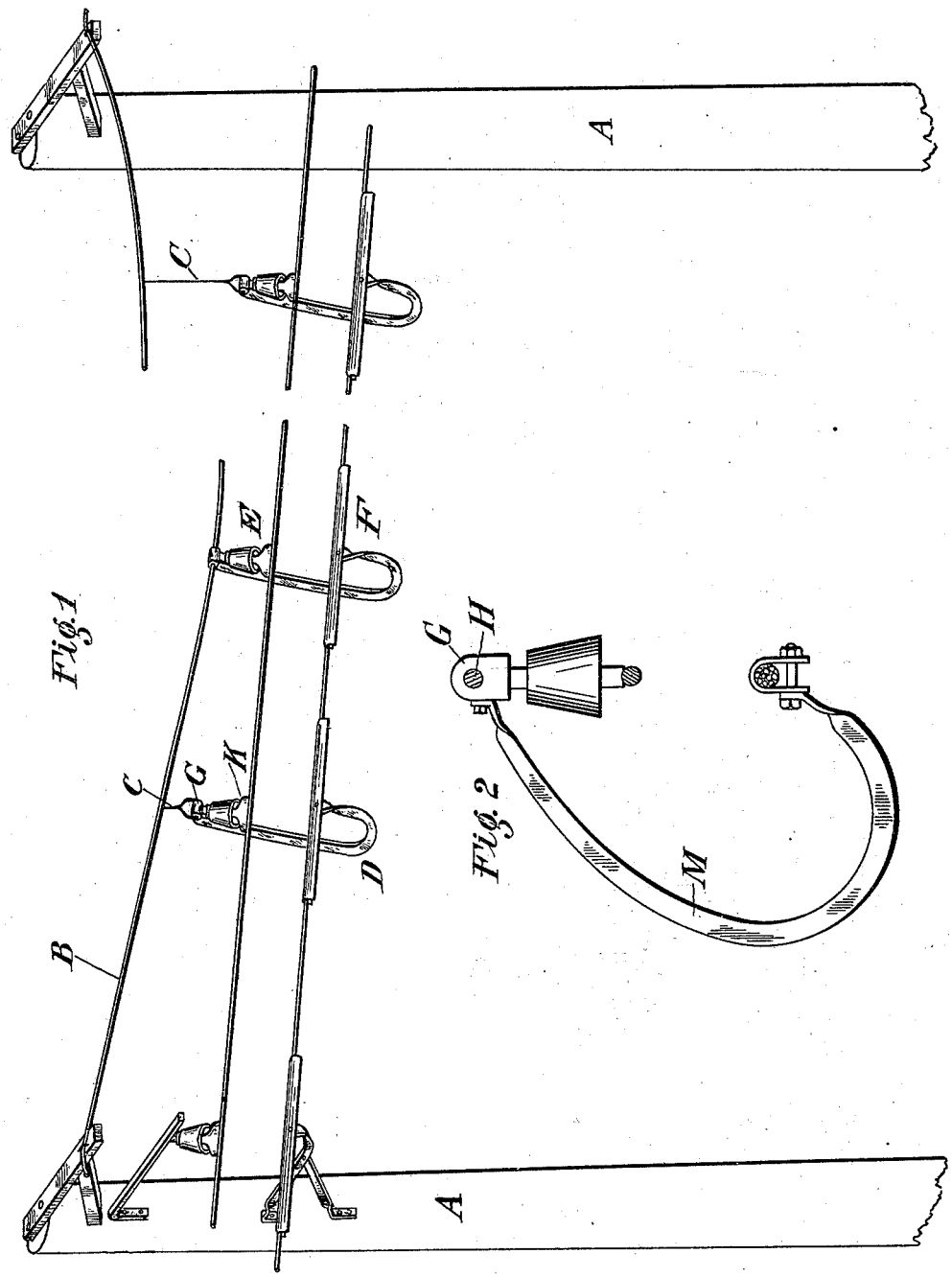
Witnesses Henry M. Harding Inventor

UNITED STATES PATENT OFFICE.

HENRY M. HARDING, OF ENGLEWOOD, NEW JERSEY.

SUPPORT FOR TROLLEY AND TRACK WIRES FOR SUSPENDED-CABLE ROADS.

SPECIFICATION forming part of Letters Patent No. 692,137, dated January 28, 1902.

Application filed April 19, 1901. Serial No. 56,558. (No model.)

*To all whom it may concern:*

Be it known that I, HENRY M. HARDING, a citizen of the United States, residing at Englewood, in the county of Bergen and State of New Jersey, have invented certain new and useful Improvements in Supports for Trolley and Track Wires for Suspended-Cable Roads, of which the following is a specification.

My invention has for its object to provide means to support the trolley and track wires for suspended-cable-track roads by which the number of fixed poles or supports required is reduced to a minimum.

In the drawings forming part of this specification, Figure 1 is a view of the system of wires. Fig. 2 is a view of the hanger used.

A A are the fixed poles or supports, placed at a distance apart depending on the strength of the wire or cables used, the weight to be carried, and the topographical nature of the locality through which the road passes. From these posts is supported in any suitable manner a supporting wire or cable B. To this cable are attached hanging wires or cables C, to the lower ends of which are attached in turn the brackets D. At the lower points of the supporting wire or cable the bracket may be attached directly to it. To these brackets are attached the trolley-wire E and the track wire or cable F. These brackets may be of any desired form or construction. As illustrated in the drawings, each bracket is formed with a head G, having an orifice H, in which the hanging wire is secured. Attached to the head in any suitable manner is an insulating-support K, to which is attached the trolley-wire E. Projecting from the head is a curved arm M, (best shown in Fig. 2,) to the end of which is attached the track-wire F. Any desired means may be used for connecting the track wire or cable to the track. At the points where the posts are located I prefer to attach these wires to separate fixed brackets supported by the posts, as shown in Fig. 1. By this construction I am enabled to do away with heavy grades where the ground is irregular, or in factories or the yards of factories I am enabled to dispense with fixed supports or posts, the advantage of which is readily seen. By this construction the size of cable-track wire may be diminished, as the trolley-wire assists in supporting the load.

The use of a supporting wire or cable enables me to support the trolley and track wires or cables equidistant from each other no matter what the grade may be or the character of the ground over which the road passes.

I claim—

1. The combination of a supporting cable or wire, a curved hanger supported therefrom, and trolley and track wires supported on said hanger, substantially as described.

2. The combination of a supporting cable or wire, a hanger supported therefrom, and trolley and track wires attached to said hangers, substantially as described.

3. The combination of a supporting cable or wire, a curved hanger supported therefrom, and trolley and track wires attached to said hangers, substantially as described.

4. A bracket for use in cable-track roads having a head, means on said head for attaching a trolley-wire-supporting device, a curved arm projecting from said head, and means on said curved arm for attaching the track-wire, substantially as described.

Signed in the city, county, and State of New York this 5th day of March, 1901.

HENRY M. HARDING.

Witnesses:
JOHN J. RANAGAN,
LOUIS N. WHEALTON.